United States Patent
Sugata et al.

(10) Patent No.: US 9,093,219 B2
(45) Date of Patent: Jul. 28, 2015

(54) BIAXIALLY ORIENTED POLYPROPYLENE FILM, METALLIZED FILM, AND FILM CAPACITOR

(75) Inventors: Masami Sugata, Tsuchiura (JP); Katsuya Okamoto, Tsuchiura (JP); Tetsuya Asano, Tsuchiura (JP)

(73) Assignee: Toray Industries, Inc. (JP)

( * ) Notice: Subject to any disclaimer, the term of this patent is extended or adjusted under 35 U.S.C. 154(b) by 44 days.

(21) Appl. No.: 13/703,173

(22) PCT Filed: Jun. 9, 2011

(86) PCT No.: PCT/JP2011/063213
§ 371 (c)(1), (2), (4) Date: Jan. 29, 2013

(87) PCT Pub. No.: WO2012/002123
PCT Pub. Date: Jan. 5, 2012

(65) Prior Publication Data
US 2013/0170096 A1    Jul. 4, 2013

(30) Foreign Application Priority Data
Jun. 29, 2010    (JP) .................................. 2010-147234

(51) Int. Cl.
| H01G 2/00 | (2006.01) |
| H01G 4/18 | (2006.01) |
| B29C 55/12 | (2006.01) |
| C08J 5/18 | (2006.01) |
| B29K 23/00 | (2006.01) |

(52) U.S. Cl.
CPC *H01G 2/00* (2013.01); *B29C 55/12* (2013.01); *C08J 5/18* (2013.01); *H01G 4/18* (2013.01); *B29K 2023/12* (2013.01); *B29K 2995/0072* (2013.01); *C08J 2323/12* (2013.01); *Y10T 428/24355* (2015.01)

(58) Field of Classification Search
CPC ........... H01G 4/145; H01G 4/18; H01G 4/14; B29C 55/12
USPC .................................................. 361/323, 311
See application file for complete search history.

(56) References Cited

U.S. PATENT DOCUMENTS

| 3,223,764 A * | 12/1965 | Henze et al. ............... 264/178 R |
| 4,505,966 A * | 3/1985 | Adachi et al. .................. 428/141 |
| 5,132,157 A * | 7/1992 | Asanuma et al. ............. 428/141 |
| 6,303,233 B1 * | 10/2001 | Amon et al. ................... 428/516 |
| 6,517,920 B1 * | 2/2003 | Schroder et al. ............. 428/36.7 |
| 2004/0126518 A1 * | 7/2004 | Mendes et al. ............... 428/34.8 |
| 2009/0136714 A1 * | 5/2009 | Itou ............................... 428/152 |

FOREIGN PATENT DOCUMENTS

| JP | 51-63500 | 6/1976 |
| JP | 54-53253 | 4/1979 |
| JP | 61-145812 | 7/1986 |
| JP | 62-121704 | 6/1987 |
| JP | 2-308826 | 12/1990 |
| JP | 4-348942 | 12/1992 |
| JP | 10067972 A * | 3/1998 |
| JP | 2869606 | 3/1999 |
| JP | 2001-72778 | 3/2001 |
| JP | 2001-129944 | 5/2001 |
| JP | 2001-324607 | 11/2001 |
| JP | 3508515 | 3/2004 |
| JP | 2007-290380 | 11/2007 |
| JP | 2007308604 A * | 11/2007 |
| JP | 2009-088492 | 4/2009 |
| JP | 2009-542872 | 12/2009 |
| WO | 2008/006530 A1 | 1/2008 |

OTHER PUBLICATIONS

Mitsuyoshi Fujiyama et al., "Study on Rough-Surface Biaxially Oriented Polypropylene Film.I. Formation of β-Form Crystals in Sheet Cast with T-Die Extruder," *Journal of Applied Polymer Science*, vol. 36, pp. 985-1066 (1988).

* cited by examiner

*Primary Examiner* — David M Sinclair
(74) *Attorney, Agent, or Firm* — DLA Piper LLP (US)

(57) ABSTRACT

A biaxially oriented polypropylene film has projections on both surfaces of the film, wherein the height of the most common projection (PhZ) among the projections on each surface is not less than 100 nm and less than 400 nm on both surfaces, and the number of projections per 0.1 mm² (Pc) on each surface is not less than 150 and less than 500 on both surfaces. The biaxially oriented polypropylene film is easily processed into an element and that, when processed into a capacitor, provides a capacitor having high withstand voltage characteristics and excellent noise characteristics.

11 Claims, No Drawings

BIAXIALLY ORIENTED POLYPROPYLENE FILM, METALLIZED FILM, AND FILM CAPACITOR

RELATED APPLICATIONS

This is a §371 of International Application No. PCT/JP2011/063213, with an international filing date of Jun. 9, 2011, which is based on Japanese Patent Application No. 2010-147234, filed Jun. 29, 2010, the subject matter of which is incorporated by reference.

TECHNICAL FIELD

This disclosure relates to a biaxially oriented polypropylene film suitable for capacitor applications, more particularly, to a biaxially oriented propylene film that is easily processed into an element and, when processed into a capacitor, provides a capacitor with high withstand voltage and low noise. Hereinafter, the characteristics of such a biaxially oriented propylene film are each referred to as processability into elements, withstand voltage characteristics, and noise characteristics.

BACKGROUND

Polypropylene films have been widely used in electrical applications because of, for example, their excellent electrical characteristics. In particular, their use as a dielectric material in capacitor applications is significantly increasing. In recent years, there has been a strong demand for miniaturization and lower prices, and the thickness of a film that acts as a dielectric has become increasingly thinner. In addition, required withstand voltage characteristics and processability into elements have also become severe.

Further, for flat capacitors typified by a safety standard capacitor, there has been an increasing demand for reducing the noise due to film oscillation (acoustic pressure oscillation). This noise occurs upon oscillation of a dielectric such as a film wound around a capacitor element due to an alternating electric field applied. This noise notably occurs particularly upon high-frequency input and pulse input.

To improve the withstand voltage characteristics and processability into elements, the film surface needs to be moderately roughened. This is important particularly to improve slip characteristics of the film. Further, this is particularly important for providing preservability in a metallized capacitor. The preservability is such a function that, in a metallized capacitor in which a metallized film that serves as an electrode is formed on a dielectric film, the deposited metal is dispersed by discharge energy at the time of abnormal discharge to restore the insulation characteristics and prevent a short circuit, thereby maintaining the function of the capacitor or preventing breakdown. The preservability is an extremely useful function also from the standpoint of safety.

In capacitors used under application of an AC voltage, when the surface roughness a film is large, corona discharge occurs between the film layers and corona breakdown between the layers is likely to occur. Thus, it is necessary to narrow a gap between the film layers. If the gap between the film layers is narrowed, film oscillation due to application of an alternating electric field can be suppressed to reduce noise. Thus, it is important to narrow an interval between the film layers also for reducing noise.

Thus, to achieve high withstand voltage characteristics and suitable processability into elements and noise characteristics, it is necessary to narrow an interval between film layers to suppress corona generation and noise while roughening the surface of the film to obtain preservability and slip characteristics.

Examples of the method for roughening a film surface proposed include mechanical methods such as embossing and sandblasting, chemical methods such as chemical etching using an solvent, the method of stretching a sheet in which a dissimilar polymer such as polyethylene is mixed, the method of stretching a sheet in which β-crystals are formed, and the like (JP 51-63500 A and JP 2001-324607 A).

However, the mechanical and chemical methods result in low roughness density, and the method of stretching a sheet in which β-crystals are formed is likely to form bulky projections. In addition, films the surface of which has been roughened by these methods have problems in that, for example, a gap between film layers are ununiform, and at sites where the gap have been widened by the bulky projections, corona discharge is likely to occur when an AC voltage is applied, resulting in a reduced capacitor lifetime and degraded noise characteristics as well. The method of stretching a sheet in which a dissimilar polymer such as polyethylene is blended has a problem of poor recyclability, that is, although few bubbles are left when a capacitor is formed, the dissimilar polymer can have an adverse effect when the film is recycled.

As a film having a uniform roughness density on the film surface and a uniform projection size, a high melt strength polypropylene film has also been proposed (JP 2001-72778 A). A film formed by laminating the high melt strength polypropylene film and a normal polypropylene film has also been proposed (JP 2001-129944 A).

However, there is a problem in that when a high melt strength polypropylene resin itself is used in capacitor applications, sufficient heat resistance or pressure resistance cannot be obtained because of the structure of the resin, and the dielectric breakdown voltage particularly at a high temperature significantly decreases. In addition, when using a technique of laminating high melt strength polypropylene resins, it is very difficult to obtain a structure with uniform laminate thickness particularly in the case of a thin film with a film thickness of 5 μm or less, and a practically satisfactory dielectric film cannot be provided because of impaired uniformity.

A biaxially stretched polypropylene film the roughness of the film surface of which is controlled and a method for producing the same have also been disclosed (Japanese Patent No. 3508515).

However, this technique is insufficient for obtaining uniform projection density while narrowing the interval between layers on both film surfaces.

A technique for forming a film surface with a fine roughness and balancing element winding characteristics and pressure resistance by controlling the β-crystal fraction of a cast original sheet within a certain range to thereby has also been disclosed (Japanese Patent No. 3508515 and JP 54-53253 A). In Japanese Patent No. 3508515 and JP 54-53253 A, roughness on one surface of a film is defined.

However, roughness on both surfaces of a film cannot be sufficiently controlled by that production method, and fine surface roughness of the resulting film cannot provide high withstand voltage characteristics and noise characteristics at the same time.

On the other hand, with regard to noise, a proposal for minimizing the volume between each layer of a wound film to enhance adhesion between the films has been made. For example, the method of taking up a capacitor element under reduced pressure has been proposed (JP 54-53253 A). Applying a corona discharge treatment to both surfaces of a polypropylene film has also been proposed (JP 61-145812 A).

However, in the method of winding an element under reduced pressure, the process for winding a capacitor element is complicated, resulting in decreased productivity. Further, when the element is placed back in air after winding the capacitor element, reintrusion of air between the film layers cannot be prevented. In the method of applying a corona discharge treatment to both surfaces of a film, blocking can occur before the process of winding up into a capacitor element, for example, in the vacuum deposition process or the like.

Further, it has been proposed that the thermal shrinkage stress value at 120° C. and heat seal strength in the longitudinal direction is optimized to obtain a film for a capacitor that shows a small decrease in electrical capacitance when a voltage has been applied in a high temperature environment for a long period of time and decreases the noise of the capacitor (JP 2009-088492 A).

However, although the noise characteristics and the occurrence of corona discharge can be inhibited, only the optimization of the thermal shrinkage stress value at 120° C. and heat seal strength in the longitudinal direction cannot ensure sufficient preservability of the capacitor because of too strong adhesion between the films or provide high withstand voltage characteristics.

It could therefore be helpful to provide a biaxially oriented polypropylene film that has high withstand voltage characteristics, suitable processability into elements, and excellent noise characteristics particularly in AC voltage capacitor application, and to provide a metallized film and a film capacitor using the biaxially oriented polypropylene film.

We thus provide:

(1) A biaxially oriented polypropylene film having projections on both surfaces of the film, wherein the height of the most common projection (PhZ) among the projections present on each surface is not less than 100 nm and less than 400 nm on both surfaces, and the number of projections per 0.1 mm$^2$ (Pc) on each surface is not less than 150 and less than 500 on both surfaces.

(2) A metallized film formed by providing at least one surface of the biaxially oriented polypropylene film with a metal film.

(3) A film capacitor using the metallized film.

By having a film surface with a number of low-height projections on both sides, a biaxially oriented polypropylene film having high withstand voltage characteristics, suitable processability into elements, and excellent noise characteristics particularly in AC voltage capacitor application can be provided. Further, a metallized film and a film capacitor using the biaxially oriented polypropylene film can be provided.

DETAILED DESCRIPTION

The biaxially oriented polypropylene film, metallized film, and film capacitor will now be described in more detail.

First, the technological background will be described.

Various indices described below are defined to indicate a gap between film layers and slipperiness, which are closely related to the withstand voltage characteristics and capacitor processability into elements of the polypropylene film. Each of these indices indicates surface morphology that was not able to be expressed by the conventional two-dimensional or three-dimensional center line surface roughness and has hitherto hardly been achieved.

To improve noise characteristics, it is desirable to smoothen film surface and reduce a gap between film layers as much as possible when a capacitor element is produced. However, if the film surface is smoothened by reducing the number density of projections on the film surface to reduce a gap between film layers, slip characteristics are significantly reduced, and consequently defects such as wrinkling occur in a film-forming process and an element-producing process. In addition, in high-speed film formation, the volume of air brought in during film conveyance increases. Therefore, if the film surface is too smooth, the air brought in cannot be appropriately removed, which can result in widening of the interval between layers of the film. To prevent this, film formation at low speed can be possible, but, in that case, productivity decreases. For that reason, conventionally, films both surfaces of which are extremely smooth have not been generally used in capacitor applications.

Further, if the film surface is smoothened when the film is used as a capacitor element, preservability is reduced. For example, a short circuit occurs and breakdown of the capacitor element occurs.

Unlike the conventional roughness, the number density of projections on the film surface (Pc) and the height of the most common projection (PhZ) among the projections present on each surface were defined to thereby obtain a polypropylene film having high withstand voltage characteristics, suitable processability into elements, and excellent noise characteristics. This solved the problems mentioned above. The method for measuring the number density Pc and the projection height PhZ will be mentioned below.

The biaxially oriented polypropylene film has projections on both surfaces, and the height of the most common projection (PhZ) among the projections present on each surface is not less than 100 nm and less than 400 nm on both surfaces and the number of projections per 0.1 mm$^2$ (Pc) on each surface is not less than 150 and less than 500 on both surfaces.

When the height of the most common projection (PhZ) among the projections on each surface is less than 100 nm, the interval between layers of the film is extremely narrow, and, consequently, preservability can be reduced: for example, slip characteristics are degraded to decrease processability into elements, or a capacitor breaks down. When the height is not less than 400 nm, the interval between layers of the film is wide and, consequently, noise characteristics can be degraded, or corona discharge can occur between the film layers to reduce pressure resistance.

The biaxially oriented polypropylene film has a PhZ in the range described above and thus does not have bulky projections. Hence, when the number of projections per 0.1 mm$^2$ (Pc) on each surface is less than 150 on both surfaces, the film surface is extremely smooth, and there can be cases where the film cannot be successfully wound because of, for example, insufficient air escape, resulting in disordered roll shape, and the slitting process and capacitor element formation are not successfully performed. Furthermore, there can also be cases where the number of projections holding the interval between film layers decreases, and the interval between film layers locally becomes extremely narrow, significantly degrading the preservability. When the number is not less than 500, adhesion decreases because air is contained in large volumes in the winding, and consequently noise characteristics can be degraded.

In terms of capacitor element size and film-forming stability, the biaxially oriented polypropylene film preferably has a film thickness t1 according to the micrometer method of 2.5 to 20 µm, more preferably 3 to 15 µm, and particularly preferably 3.5 to 7 µm. When the thickness of the film t1 is not less than 2.5 µm, sufficient mechanical strength and dielectric breakdown strength are provided. When the thickness of the film t1 is not more than 20 µm, films with a uniform thickness can be produced, and higher capacitance per volume can be provided when used as a dielectric for a capacitor.

In the biaxially oriented polypropylene film, when taking the 10-point average roughness as SRz, the SRz of either surface is preferably not less than 400 nm and not more than 850 nm, more preferably not less than 450 nm and not more than 800 nm, and still more preferably not less than 500 nm and less than 750 nm. When the SRz is not more than 850 nm, a gap of the film does not partly widen due to bulky projections and corona discharge does not occur when an AC voltage is applied, and, consequently, the life of a capacitor extends and noise characteristics improves even further. When the SRz is not less than 400 nm, wrinkling, film tearing, or the like does not occur during film conveyance, and films can be stably conveyed.

In the biaxially oriented polypropylene film, when taking the center-line average roughness as SRa, the SRa of either surface is preferably not less than 10 nm and not more than 40 nm, more preferably not less than 10 nm and less than 35 nm, and still more preferably not less than 10 nm and less than 30 nm. When the SRa is not more than 40 nm, air does not readily enter between layers when films are laminated, and corona discharge does not readily occur when an AC voltage is applied, and, consequently, deterioration of a capacitor element and reduction of withstand voltage can be inhibited. In addition, noise characteristics will be even better. Further, when a metal layer is formed on the film, the thickness of the metal film is uniform, and puncturing or the like does not occur on the metal layer; consequently, dielectric breakdown, decrease in element lifetime, occurrence of electrical insulation defects due to charge concentration, or the like can be prevented when a voltage is applied in a high temperature environment. When the SRa is not less than 10 nm, the film has good slip characteristics, and handleability will be good. Besides, air escapes well, and the film is wound satisfactorily; consequently, the roll shape will not be disordered; wrinkling will not occur between the film layers; or the gap between the film layers will not be ununiform. Accordingly, withstand voltage characteristics and noise characteristics will be even better. In addition, because the interval between the film layers is sufficient, preservability is good, and a short circuit or breakdown of a capacitor element will not occur when the film is used as the capacitor element.

If a film has a projection height PhZ and the number of projections Pc in the ranges described above, the film will have characteristic surfaces with excellent balance between projection density and projection height on the surfaces. Capacitors made of such a biaxially oriented polypropylene film are able to maintain the capacitor lifetime without causing breakdown as a capacitor even if dielectric breakdown occurs because they have a number of projections between the film layers. Namely, capacitors that are able to stably exhibit preservability are provided. In addition, capacitors made of such a biaxially oriented polypropylene film have a narrow gap between the film layers. Further, such a biaxially oriented polypropylene film has good slip characteristics on the film surface, and thus provides good winding in making a capacitor and a uniform gap between the film layers of the capacitor. Because of such a narrow and uniform interval between the film layers, film oscillation can be prevented when an alternating electric field is applied, and a capacitor having very excellent noise characteristics is provided.

Further, if the film also has a 10-point average roughness SRz and a center-line average roughness SRa in the ranges described above, the film has even more excellent balance between projection density and projection height on the surfaces.

The biaxially oriented polypropylene film preferably contains a branched polypropylene (H) in an amount of 0.02 to 10% by mass. The branched polypropylene (H) as used herein refers to a polypropylene having 5 or less tri-substituted internal olefins per 10,000 carbon atoms. The presence of the tri-substituted internal olefins can be confirmed by the proton ratio in $^1$H-NMR spectrum.

By containing the branched polypropylene (H) in an amount of 0.05 to 10% by mass, the size of spherulites formed in a process for cooling melt-extruded resin sheets can be more readily controlled to be small, and formation of electrical insulation defects formed in a stretching process can be reduced, whereby a polypropylene film having excellent withstand voltage characteristics can be obtained. Further, the branched polypropylene, while having an effect like that of α-crystal nucleating agents, is also capable of forming a rough surface by crystal modification if the amount to be added is in a certain range. This effect, combined with the above-described effect of decreasing the size of spherulites, allows compact formation of the crater-like projection group mentioned below with its size being small, thereby providing a biaxially oriented polypropylene film having a surface roughness characterized by excellent projection uniformity and no bulky projection. The content of the branched polypropylene (H) is more preferably 0.05 to 6% by mass. When the content of the branched polypropylene (H) is in the above range, a film with improved winding characteristics and withstand voltage characteristics and excellent processability into elements and capacitor characteristics can be obtained.

The method for forming the film surface described above will now be described. As a representative method, from the standpoint of no addition of electrical impurities and low possibility of deterioration of electrical characteristics such as dielectric breakdown voltage, a method that utilizes crystal modification to obtain projections and surface roughness of interest can be employed.

Surface morphologies obtained by crystal modification will now be described. The surface forming method using crystal modification is, as described, for example, in M. Fujiyama, *Journal of Applied Polymer Science* 36, pp. 985-1048 (1988) and the like, a method in which a surface is formed by utilizing two crystal systems of polypropylene. This is a method of forming irregularities on a film surface by forming spherulites of α-crystal (monoclinic system, crystal density: 0.936 g/cm$^3$) system and spherulites of β-crystal (hexagonal system, crystal density: 0.922 g/cm$^3$) system on an unstretched sheet and modifying the thermally unstable β-crystals into α-crystals in a stretching process. Since the basic unit of surface irregularities obtained by this method derives from deformation of the spherulites, the shape can be a crater shape formed elliptically or circularly by projection groups. The surface shape obtained by crystal modification can be formed by the presence of a number of the crater shape, and the crater shape can be formed by an elliptical or circular series of individual projections.

Further, the technique is characterized in that the area where spherulites of β-crystal system do not exist does not form irregularities and is relatively flat. The crater-shaped projections described above change shape according to the ratio of longitudinal stretching to transverse stretching in biaxial stretching, and the shape is substantially circular at a longitudinal/transverse ratio of 1, i.e., in isotropic stretching and flattens with the increase of longitudinal/transverse ratio. Generally, shapes obtained by sequential biaxial stretching often have a major axis in the transverse direction (the width direction of film rolls) of a film. Depending on the way spherulites are formed, the shape can be a shape of a plurality of stacked craters of different shapes, or circular arcs are sometimes not closed like a ring to form an arched or half-arc shape.

As a method of forming the surface shape, the method of enhancing nucleation ability by adding a material having a nucleating effect can be employed. By using this method, a number of small fine projections are made to exist by increasing the number of nucleuses to reduce relatively flat areas (areas where the projections are not present), whereby surface morphology in which projections are formed uniformly as a whole can be obtained. Such a surface is likely to satisfy the surface shape described above because of compact formation of projections.

Examples of materials having a nucleating effect include the branched polypropylene (H) mentioned above. The control of the content of the branched polypropylene (H) and the film-forming conditions allows control of the crater shape described above, which in turn allows formation of the characteristic surface shape described above.

The biaxially oriented polypropylene film is preferably composed of a mixture of the branched polypropylene (H) described above with a linear polypropylene. This allows an elevated melt crystallization temperature of 115° C. or higher compared to that of usual polypropylene of near about 110° C. Namely, when the melt crystallization temperature is high in a self-healing process of a capacitor, preservability is readily restored, and withstand voltage characteristics improves without breakdown. Specifically, when deposited metal near a discharging part is dispersed by discharge energy that generates when a dielectric film undergoes dielectric breakdown for some reasons, the film itself partially melts because the temperature increases in some parts, but recrystallization readily occurs soon and the insulation characteristics are readily restored because of high melt crystallization temperature. In general, recrystallization hardly occurs and the insulation characteristics are hardly restored when the atmosphere temperature of a capacitor is elevated, but by increasing the melt crystallization temperature as described above, recrystallization under the high temperature during dielectric breakdown readily occurs and preservability can be improved. Further, by securing a gap between film layers by controlling the surface roughness, for example, to roughen the surface, the insulation characteristics are restored even better and the withstand voltage characteristics improve even further.

Although the branched polypropylene (H) is not particularly limited, from the standpoint of film-forming properties, those having a melt flow rate (MFR) in the range of 1 to 20 g/10 min are preferred, and those having a melt flow rate in the range of 1 to 10 g/10 min are more preferred. When the MFR is less than 1 g/10 min, there are concerns that the internal pressure of an extruder may excessively increase during film formation because of extremely increased viscosity; breakage may occur because of deteriorated film-forming properties; and the like. When the MFR is more than 20 g/10 min, there is a concern that a film cannot be formed because of extremely low viscosity. The melt strength is preferably in the range of 1 to 30 cN and more preferably in the range of 2 to 20 cN. When the melt strength is less than 1 cN, the uniformity of projections is poor, whereas when the melt strength is 30 cN or higher, a preferred projection height cannot be retained.

To obtain the branched polypropylene (H), the method of blending oligomers or polymers having a branched structure, the method of introducing a long-chain branched structure into a polypropylene molecule as described in JP 62-121704 A, the method described in Japanese Patent No. 2869606, and the like are preferably used. Alternatively, a short-chain branch may be introduced as described in JP 2009-542872 A. Specific examples include "Profax PF-814" available from Basell and "Daploy HMS-PP" (WB130HMS, WB135HMS, and the like) available from Borealis, among which a resin obtained by the electron beam crosslinking method is preferably used because the amount of gel components in the resin is small. The feature shown when such a branched polypropylene (H) is added to a normal linear polypropylene (PP) is that the melt crystallization temperature rises to the range of 115 to 130° C. although that of PP is usually around 110° C.

When such a branched polypropylene (H) is added to a normal linear polypropylene (PP), the content of the branched polypropylene (H) based on the total film is preferably 10% by mass at most. The content is more preferably 0.02 to 8% by mass and more preferably 0.05 to 6% by mass.

When such a resin composition is employed, at least two melting peak temperatures will be observed in the film. Namely, as a melting peak observed when making measurements in the 2nd-Run, a shoulder peak temperature of 148 to 157° C. can be observed in addition to a first melting peak temperature of 160 to 172° C., whereby a film having uniform projections and having a compact surface shape with few bulky projections can be obtained. Further, when such contents are employed, a biaxially oriented polypropylene film can be produced that has excellent uniform projections and an excellent surface shape with few bulky projections and exhibits excellent processability and high withstand voltage characteristics even under the conditions of an atmospheric temperature in a wide range from −40° C. to over 80° C.

Next, the linear polypropylene (PP) described above will be described. The polymer is generally used for packaging materials and a capacitor, and, preferably, the cold xylene soluble fraction (hereinafter referred to as CXS) is preferably not more than 4% by mass. The cold xylene soluble fraction (CXS) herein refers to polypropylene components dissolved in xylene after complete dissolution of a sample in xylene followed by precipitation at room temperature, and probably corresponds to components that are hard to crystallize because of low tacticity, low molecular weight, or the like. When such components are contained in the resin in large amounts, problems can arise, such as poor thermal dimensional stability of the film and reduced dielectric breakdown voltage at a high temperature. Thus, the CXS is preferably not more than 4% by mass, more preferably not more than 3% by mass, and particularly preferably not more than 2% by mass. It is preferred that the linear polypropylene used satisfy the range described above, and it is also preferred that the whole film comprising this polymer as a component satisfy the range described above. The amount of the CXS is preferably as small as possible, and the substantial lower limit is about 1% by mass.

To obtain a polymer or a polypropylene film having the CXS as described above, the method of increasing the catalytic activity in obtaining a polymer, the method of washing the polymer obtained with a solvent or the propylene monomer itself, and the like can be used. From the same standpoint, the meso pentad fraction of the linear polypropylene is preferably 0.95 or more and more preferably 0.97 or more. The meso pentad fraction is an indicator of tacticity of a crystal phase of polypropylene determined by the nuclear magnetic resonance method (NMR method), and the higher the value, the higher the crystallinity; the higher the melting point; and the higher the dielectric breakdown voltage at a high temperature, which is preferred. The upper limit of the meso pentad fraction is not particularly defined. Examples of the method for obtaining a polymer having such a high tacticity include the method of washing the resin powder obtained with a solvent such as n-heptane as mentioned above and the like. The meso pentad fraction is preferably as high as possible, and the substantial upper limit is about 0.995.

The linear polypropylene preferably has, in terms of film-forming properties, a melt flow rate (MFR) in the range of, more preferably, 1 to 10 g/10 min (230° C., 21.18 N load) and, particularly preferably, 2 to 5 g/10 min (230° C., 21.18 N load).

Although the linear polypropylene is mainly composed of homopolymers of propylene, it may contain, for example, copolymer components of other unsaturated hydrocarbon to the extent that the film is not impaired or may be blended with polymers of not propylene alone. Examples of such copolymer components and monomer components constituting a blend include ethylene, propylene (in the case of a copolymerized blend), 1-butene, 1-pentene, 3-methylpentene-1,3-methylbutene-1,1-hexene, 4-methylpentene-1,5-ethylhexene-1,1-octene, 1-decene, 1-dodecene, vinylcyclohexene, styrene, allylbenzene, cyclopentene, norbornene, 5-methyl-2-norbornene, and the like. In terms of dielectric breakdown withstand characteristics and dimensional stability, the amount of copolymerization or blending is preferably less than 1 mol % for the amount of copolymerization and less than 10% by mass for the amount of blending.

The linear polypropylene can also contain various additives such as crystal nucleating agents, antioxidants, heat stabilizers, glidants, antistatic agents, antiblocking agents, fillers, viscosity modifiers, stain inhibitors, and the like to the extent that the film is not impaired.

Among them, selection of the type and content of antioxidants can be important for improving long-term heat resistance. Namely, the antioxidants are preferably phenolic ones having a steric hindrance, at least one of which is a high-molecular-weight one with a molecular weight of 500 or more. Specific examples thereof include various ones, and it is preferable to use, for example, 2,6-di-t-butyl-p-cresol (BHT: molecular weight 220.4) in combination with 1,3,5-trimethyl-2,4,6-tris(3,5-di-t-butyl-4-hydroxybenzyl)benzene (for example, Irganox (registered trademark) 1330 available from BASF Japan: molecular weight 775.2), tetrakis [methylene-3(3,5-di-t-butyl-4-hydroxyphenyl)propionate] methane (for example, Irganox1010 available from BASF Japan: molecular weight 1,177.7), or the like. The total content of these antioxidants is preferably in the range of 0.03 to 1% by mass based on the total amount of polypropylene. When the amount of the antioxidants is too small, the long-term heat resistance can be poor. When the amount of the antioxidants is too large, the blocking at a high temperature due to bleeding out of these antioxidants can adversely affect a capacitor element. The content is more preferably 0.1 to 0.9% by mass and particularly preferably 0.2 to 0.8% by mass.

Crystal nucleating agents can be added to the extent that the film is not impaired. As mentioned above, the branched polypropylene per se has an α-crystal or β-crystal nucleating effect, and it is also preferable to add another type of α-crystal nucleating agent (dibenzylidene sorbitols, sodium benzoate, and the like), β-crystal nucleating agent (amide compounds such as 1,2-hydroxy potassium stearate, magnesium benzoate, and N,N'-dicyclohexyl-2,6-naphthalenedicarboxamide, quinacridone compounds, and the like), and the like. However, by adding these crystal nucleating agents, desired surface roughness can hardly be obtained, and the addition may have an adverse effect on electrical characteristics such as reduced volume specific resistance at a high temperature; thus the content is preferably less than 0.1% by mass. More preferably, it is preferred that the crystal nucleating agents be substantially not added.

The glossiness of the film surface is preferably in the range of 100 to 150% and more preferably 120 to 140%. Namely, reducing the glossiness means increasing the light scattering density at the film surface, i.e., making the irregularities on the film surface compact, and means increasing the number of projections per unit area. However, when the glossiness is reduced to less than 100%, good film handleability is provided, but the increased number of projections tends to increase the air volume between the projections, which in turn widens the gap between film layers, thereby degrading noise characteristics. On the other hand, when the glossiness is more than 150%, the decreased number of projections causes unslipperiness between film layers, and it is difficult to form the film into a flat capacitor element. Besides, insufficient air escape readily occurs, and the gap between film layers is widened when the film is formed into a capacitor element, which can degrade noise characteristics. Further, problems can arise: for example, sufficient clearance between film layers cannot be maintained and preservability degrades. When the glossiness is in the range described above, good element winding characteristics, pressure resistance, preservability, and noise characteristics are provided.

The thermal shrinkage stress characteristic value (hereinafter referred to as thermal shrink stress value) in the longitudinal direction of the biaxially oriented polypropylene film is preferably 0.8 to 3.0 N/mm$^2$. The temperature showing the peak of the thermal shrink stress value is preferably in the range of 110 to 130° C. The thermal shrink stress value is more preferably 1.0 to 3.0 N/mm$^2$. When the thermal shrink stress value is lower than 0.8 N/mm$^2$, tight winding due to thermal shrinkage does not readily occur in the winding of a capacitor element, and consequently the gap between film layers is not filled, which can degrade noise characteristics. When the thermal shrink stress value is higher than 3.0 N/mm$^2$, a uniform element sometimes cannot be formed in an annealing step during element formation because of too tight a winding of the film.

The thermal shrinkage starting temperature in the longitudinal direction is preferably 60 to 100° C., more preferably 65 to 90° C., and particularly preferably 70 to 85° C. When the thermal shrinkage starting temperature is lower than 60° C., there are concerns about the occurrence of wrinkling during deposition processing and the occurrence of thermal defects due to poor adhesion to a cooling drum. On the other hand, when the thermal shrinkage starting temperature is higher than 100° C., adhesion between layers in the annealing step during element formation is poor, which can cause a problem particularly in alternating current applications. Examples of the method of controlling such a thermal shrink stress value and thermal shrinkage starting temperature include the method in which the stretching temperature and stretching ratio in the production of the film are appropriately selected. Specifically, by decreasing the stretching temperature and/or increasing the stretching ratio, the thermal shrinkage starting temperature can be lowered and the thermal shrink stress value can be increased.

The ash content of the biaxially oriented polypropylene film is preferably not more than 50 ppm (on a mass basis, the same shall apply hereinafter), more preferably not more than 30 ppm, and particularly preferably not more than 20 ppm. When the ash content is more than 50 ppm, dielectric breakdown withstand characteristics of the film decrease, and dielectric breakdown strength can decrease when the film is formed into a capacitor. For the ash content to be in this range, it is important to use a low-catalyst-residue material, and the method for reducing contamination from an extrusion system during film formation as much as possible and the method in which the bleeding time (the time for passing the material through the extrusion system to wash inside a pipe before film formation), for example, is one hour or more can be employed. The ash content is preferably as low as possible, and the substantial lower limit is about 10 ppm.

The biaxially oriented polypropylene film is preferably used as a dielectric film for a capacitor, but the type of the capacitor is not particularly limited. Specifically, in terms of electrode composition, the capacitor may be either of a foil-wound capacitor or a metallized film capacitor, and the film is preferably used also for an oil-immersed capacitor impregnated with insulating oil and a dry capacitor which does not use insulating oil at all. It is especially useful particularly in an oil-immersed capacitor impregnated with insulating oil. From the standpoint of shape, the capacitor may be a wound capacitor or a stacked capacitor. Among the above, the film is preferably used particularly as a metallized-film wound capacitor in terms of the characteristics of the film.

Polypropylene films generally have a low surface energy so that it is difficult to stably deposit a metal thereon. Thus it is preferable to perform a surface treatment in advance to provide good metal adhesion. Specific examples of the surface treatment include corona discharge treatment, plasma treatment, glow treatment, flame treatment, and the like. Although polypropylene films generally have a surface wetting tension of about 30 mN/m, such a surface treatment increases the wetting tension to about 37 to 50 mN/m, preferably, 39 to 48 mN/m, thereby providing a film having excellent adhesiveness to a metal film and good preservability.

The biaxially oriented polypropylene film is obtained by biaxial stretching using materials that can provide the characteristics mentioned above. It is obtained by any biaxial stretching method such as inflation simultaneous biaxial stretching, stenter simultaneous biaxial stretching, and stenter sequential biaxial stretching, and among them, films formed by the stenter sequential biaxial stretching are preferably used in terms of film-forming stability, thickness uniformity, and controlling of film surface shape.

Next, the method of producing the biaxially oriented polypropylene film will now be described, but the films are not necessarily limited thereto.

First, a linear polypropylene (PP) is blended with a high melt strength polypropylene resin (branched polypropylene (H)), and the resultant is melt extruded. The melt extruded resin is filtered through a filter and then extruded from a slit-shaped die (flat die) at a temperature of 220 to 280° C. The polymer extruded from the die is solidified on a cooling drum to obtain an unstretched sheet. To obtain the film, it is preferable to appropriately form β-crystals, and to achieve this, it is important to appropriately control the temperature of the cooling drum. To form β-crystals with efficiency, it is preferable to keep the temperature of the resin at a temperature at which β-crystals can be formed for a predetermined time. Specifically, the temperature of the resin is preferably 115 to 135° C. The time during which the temperature is kept is preferably 1 second to 3 seconds. When the retention time is too short, β-crystals are not sufficiently formed, which can lead to insufficient projection density. When the retention time is too long, crystallization of the film excessively proceeds, and it can be difficult to perform stretching in the following process.

To provide these conditions, the process may be appropriately determined depending on the resin temperature, extrusion rate, take-up speed, and the like. In particular, from the standpoint of productivity, the diameter of the cooling drum is preferably at least 1 m or more because the diameter of the cooling drum significantly affects the retention time.

In addition, to obtain the film, it is important to select a cooling drum temperature according to the retention time. Although the cooling drum temperature that should be selected is arbitrary to some extent because it is affected by other factors as mentioned above, but it is preferably 50 to 100° C., more preferably 60 to 80° C., and particularly preferably in the range of 60 to 70° C. When the cooling drum temperature is too high, there can be cases where crystallization of the film excessively proceeds and it is difficult to perform stretching in the following process, and voids formed in the film reduces dielectric breakdown withstand characteristics. Further, influences are likely to occur, such as temperature variation caused by reduced adhesion between the cooling drum and the film. Furthermore, bulky projections are likely to be formed because β-crystals grow big. As a method of adhesion to the cooling drum, any method such as the electrostatic application method, adhesion method utilizing surface tension of water, air knife method, press roll method, and submerged casting method may be used, and the air knife method, which provides good planarity and control of the surface roughness, is preferred. In particular, when the thickness is thick, the form difference between both sides of the film is likely to occur, and the both sides can be smoothened by appropriately controlling the temperature of an air knife. The air temperature of the air knife is preferably 20 to 60° C., more preferably 25 to 50° C., and particularly preferably in the range of 30 to 40° C. When the air temperature of the air knife is higher than 60° C., there can be cases where crystallization of the film excessively proceeds and it is difficult to perform stretching in the following process; bulky projections are likely to be formed because β-crystals grow big; and voids formed in the film reduces dielectric breakdown withstand characteristics. When the air temperature of the air knife is less than 20° C., the crystal formation is insufficient, and it can be difficult to obtain the desired number of projections on the surface.

The air blow speed of the air knife is preferably 130 to 150 m/s. Further, it is preferable to have a double duct structure to improve the uniformity in the width direction. When the air speed is less than 130 m/s, the film-forming properties can be deteriorated because the film does not adhere sufficiently to the cooling drum. When the air speed is over 150 m/s, the film-forming properties can be deteriorated or quality variation, thickness variation, and the like can occur because the film does not adhere uniformly to the cooling drum. It is preferable to adjust the position of the air knife so that air flows to the downstream of film formation to not cause film oscillation.

The unstretched film is then biaxially stretched for biaxial orientation. First, the unstretched film is preheated through a plurality of rolls maintained at 120 to 140° C. The preheating is carried out without temperature difference so that both surfaces of the film have a similar surface shape. While maintaining this temperature conditions, the film is passed through the rolls provided with a difference in peripheral speed, stretched 2 to 6-fold in the longitudinal direction, and cooled to room temperature. There needs to be a proper relationship between the temperature of the preheating rolls and the contact time of the film. Even if only the temperature is proper, difference in temperature between both film surfaces can occur if the contact time of the preheating rolls is too short or too long. On the other hand, even if the roll contact time is proper, difference in temperature between both film surfaces can occur likewise if the preheating temperature is improper.

Also, from the standpoint of controlling thermal shrink stress value and thermal shrinkage starting temperature, it is necessary to select the stretching temperature and stretching ratio appropriately. Specifically, by decreasing the stretching temperature and/or increasing the stretching ratio, the thermal shrinkage starting temperature can be lowered and the thermal shrink stress value can be increased.

When stretching the film using an even higher-power radiation heater, the power is preferably 2.0 to 3.5 kW. If the power of the radiation heater is too low, breakage can occur in a stretching process because of low-temperature stretching. If the power is too high, there can be cases where voids formed in the film reduces dielectric breakdown withstand characteristics, or the projection height becomes too high.

Following the stretching in the longitudinal direction, the uniaxially oriented film is guided to a stenter and stretched 5 to 15-fold in the width direction at a temperature of 150 to 170° C., and then heat set at a temperature of 140 to 160° C. while being subjected to 2 to 20% relaxation in the width direction. Further, to improve the adhesiveness of a deposited metal to the surface to be metallized, a corona discharge treatment is carried out in air, nitrogen, carbonic acid gas, or a mixed gas thereof to obtain a biaxially oriented film. An example of the corona discharge treatment is a discharge treatment performed at a power of about 10 to 20 kW. Further, when strict surface structure control is carried out, the thermal shrinkage stress tends to be low because the crystallinity of the film increases in the film-forming process. Thus, after the film is biaxially stretched by the flat die method as described above, it is preferable to further stretch the film using rolls of different peripheral speeds. In this case, optimal thermal shrinkage characteristics and stable stretching characteristics can be simultaneously achieved by stretching the film in the longitudinal direction at a stretching ratio of 0.1 to 3% at 100 to 130° C. Taking the film transport velocity before and after stretching as $V_0$ and $V_1$, respectively, the stretching ratio (%) is a value defined by $(V_1/V_0-1)\times100(\%)$.

It is preferable to provide at least one surface of the biaxially oriented polypropylene film described above with a metal film to obtain a metallized film. Although the method for providing a metal film is not particularly limited, for example, the method of depositing aluminum on at least one surface of the polypropylene film to provide a metal film such as an aluminum-deposited film that serves as an internal electrode of a film capacitor is preferably used. In this method, for example, other metal components such as nickel, copper, gold, silver, chromium, and zinc can also be deposited simultaneously or sequentially to aluminum. Further, the deposited film can be provided with a protective layer, for example, of oil.

The thickness of the metal film is preferably in the range of 20 to 100 nm in terms of electrical characteristics and self-healing properties of a film capacitor. For the same reason, the surface electrical resistance value of the metal film is preferably in the range of 1 to 20Ω/□. Metal species have an inherent resistance value and besides the resistance value is inversely proportional to the film thickness, and thus the surface electrical resistance value can be controlled by the metal species used and the film thickness.

After formation of a metal film, the metallized film obtained can be aged at a certain temperature or heat treated as required. Further, at least one surface of the metallized film can also be coated with polyphenylene oxide or the like for the purpose of insulation or the like.

The metallized film thus obtained can be formed into a film capacitor by lamination or winding. An example of the preferred method of producing a wound film capacitor is described below.

First, aluminum is vacuum deposited on one surface of a polypropylene film. In the deposition, aluminum is deposited as stripes having margins extending in the longitudinal direction of the film. Each deposited part and each margin on the surface were then slit at the center with a blade to produce a tape-like take-up reel having a margin on one side of the surface. One tape-like take-up reel having a margin on the left side and one tape-like take-up reel having a margin on the right side are laminated each other such that the deposited portion protrudes from the margin in the width direction and wound to obtain a wound roll. The wound roll is pressed after removing the core; metallikon is sprayed on both end faces to form an external electrode; and lead wires are welded to the metallikon, whereby a wound capacitor element can be obtained.

Film capacitors find use in various applications such as vehicles, household electric appliances (TV, refrigerator, and the like), general noise suppression, automobiles (hybrid car, power window, wipers, and the like), and power sources, and the film capacitor of the present invention can be suitably used in all of them.

The method of measuring characteristic values and the method of evaluating effects will now be described.

(1) Film Thickness (μm)

Thickness was measured by the micrometer method in accordance with JIS C-2330 (2001), 7.4.1.1.

(2) Melt Flow Rate (MFR)

Melt flow rate was measured in accordance with JIS-K7210 (1999) at a measurement temperature of 230° C. and a load of 21.18 N.

(3) Meso Pentad Fraction (mmmm)

Meso pentad fraction (mmmm) was determined using $^{13}$C-NMR by dissolving a sample in a solvent under the following conditions (reference: *High Polymer Analysis Handbook*, New Edition, edited by The Japan Society for Analytical Chemistry, Council for Analytical Research of High Polymer, 1995, pp. 609 to 611).

A. Measurement Conditions

Apparatus: DRX-500 manufactured by Bruker

Measurement nucleus: $^{13}$C nucleus (resonance frequency: 125.8 MHz)

Measurement concentration: 10 wt %

Solvent: Benzene/deuterated o-dichlorobenzene mixed solution at a mass ratio of 1:3

Measurement temperature: 130° C.

NMR sample tube: 5-mm tube

Pulse width: 45° (4.5 μs)

Pulse repetition time: 10 seconds

Conversions: 10,000 times

Measurement mode: Complete decoupling

B. Analysis Conditions

Fourier transform was performed using a LB (line-broadening factor) of 1.0, and the mmmm peak was set to 21.86 ppm. A WINFIT software (available from Bruker) is used to split peaks. In the splitting, peak splitting is carried out as described below from the peak at the high-magnetic-field side. Further, automatic fitting of the software is performed to optimize the peak splitting, and the total of peak fractions of mmmm and ss (spinning sideband peaks of mmmm) is employed as a meso pentad fraction (mmmm).

Measurements are made five times, and the average value is determined.

Peak
- (a) mrrm
- (b), (c) rrrm (split into two peaks)
- (d) rrrr
- (e) mrmm+rmrr
- (f) mmrr
- (g) mmmr
- (h) ss (spinning sideband peaks of mmmm)
- (i) mmmm
- (j) rmmr (4) The Number of Tri-Substituted Internal Olefins A sample is dissolved in a solvent, and the number of tri-substituted internal olefins is determined using $^1$H-NMR under the following conditions.

A. Measurement Conditions

Apparatus: ECX400P nuclear magnetic resonance apparatus manufactured by JEOL Ltd.

Measurement nucleus: $^1$H nucleus (resonance frequency: 500 MHz)

Measurement concentration: 2 wt %
Solvent: Deuterated o-dichlorobenzene
Measurement temperature: 120° C.
Pulse width: 45°
Pulse repetition time: 7 seconds
Conversions: 512 times
Measurement mode: Non decoupling B. Analysis Conditions On the basis of 7.10 ppm, the chemical shift of o-dichlorobenzene, a signal in the region from 5.0 to 5.2 ppm is assigned to the protons of tri-substituted internal olefins, and the proton ratio of tri-substituted internal olefins is determined from the integration ratio to a broad signal from 0.5 to 2.0 ppm.

(5) Center-Line Average Roughness (SRa), 10-Point Average Roughness (SRz), Number of Projections (Pc), Height of the Most Common Projection (Phz) among Projections Present on Each Surface The measurements were made in accordance with JIS-B-0601 (1982) using "Noncontact Three-Dimensional Microfigure Measuring Instrument (ET-30HK)" and "Three-Dimensional Roughness Analyzer (MODEL SPA-11)" manufactured by Kosaka Laboratory Ltd. First, one measurement was made to determine the center-line average roughness (SRa'), the 10-point average roughness (SRz'), the number of projections (Pc'), and the height of the most common projection (PhZ') among the projections present on each surface. The measurement was repeated ten times in the longitudinal direction, and each average value was determined. This average value was employed as the center-line average roughness (SRa), the 10-point average roughness (SRz), the number of projections (Pc), and the height of the most common projection (PhZ) among the projections present on each surface of a polypropylene film.

The detailed conditions and data processing of one measurement are as follows:

The Number of Projections (Pc') (unit: number/0.1 mm$^2$)

The detection value detected by the measuring instrument is output as a histogram at intervals of 50 nm. For example, when projections of not less than 150 nm and less than 200 nm are present as detection values, they are counted as a slice value (Z) in the column entitled 150 nm. The number of projections (Pc') represents the sum of the values obtained by converting the number of projections in all the slice values (Z) detected at sampling intervals in the width direction and the length direction shown in the item in measurement conditions of PhZ' into the number per 0.1 mm$^2$.

Height of the Most Common Projection (PhZ') Among Projections Present on Each Surface (unit: nm)

The slice value (Z) at the histogram with the highest number showing the peak among the histograms described above was employed as the height of the most common projection (PhZ') among the projections present on each surface. When there were two or more slice values (Z) with the highest number of projections, the average of the slice values was employed as the height of the most common projection (PhZ') among the projections present on each surface.

Measurement Conditions

Measuring surface treatment: Aluminum was vacuum deposited on a measuring surface by the noncontact method.
Direction of measurement: Film width direction
Feed rate in the width direction: 0.1 mm/sec
Measuring range (width direction×length direction): 1.0 mm×0.249 mm
Reference surface of elevation dimension: Lower (lower side)
Sampling interval in the width direction: 2 μm
Sampling interval in the length direction: 10 μm
Sample number in the length direction: 25
Cutoff: 0.25 mm/sec
Magnification in the width direction: ×200
Magnification in the length direction: ×20,000
Wave, roughness cut: None Measurement Method A dedicated sample holder is used to make a measurement. The sample holder is two removable metal plates with a circular hole at the center. A sample was fixed between the metal plates by mounting a film stretched to the four sides of the sample holder, and measurements were made at the area of the film corresponding to the central circular area.

Measurement Results

An example of the measurement results obtained by the method described above is shown in Table 1. When the data show the values shown in Table 1, the readout of each parameter is as follows:

Sra' 20.1 nm
SRz' 715 nm
Pc' 109/0.1 mm$^2$
PhZ' 150 nm (6) Original Film Characteristics (Dielectric Breakdown Voltage, Original Film Slit Yield)

In accordance with B method (plate electrode method) of JIS C2330 (2001) 7.4.11.2, the voltage at dielectric breakdown was measured for each of 50 samples, and the average value was determined. The value obtained by dividing the average value by the film thickness (μm) of the measured sample was employed as a final dielectric breakdown voltage (V/μm).

Those which caused weaving or wrinkling in slitting an original film were evaluated as unsatisfactory, and the number ratio of those which were evaluated as unsatisfactory to the total production was expressed as a percentage and used as an index of processability (hereinafter referred to as original film slit yield). The original film slit yield is preferably as high as possible. Not less than 95% is good "A", not less than 90% and less than 95% is "B", and less than 90% is poor "C". A or B is at a practical level.

(7) Surface Electrical Resistance of Metal Film (unit: Ω/□)

A metallized film was cut to a rectangle of 10 mm in the length direction and the full width (50 mm) in the width direction to prepare a sample. Using the four-terminal method, the resistance of the metal film was measured over 30 mm in the width direction of the sample. The measured value obtained was multiplied by the measured width (10 mm) and divided by the distance between electrodes (30 mm) to calculate a film resistance.

(8) Processability into Elements in Capacitor Production (Element Winding Yield)

On a corona-treated surface of the polypropylene film obtained in each Example and Comparative Example, metals were deposited as stripes having margins extending in the longitudinal direction using a vacuum metallizer (repetition of the deposited part with a width of 20.0 mm and the margin with a width of 2.0 mm). The deposited metal species were metallic aluminum and metallic zinc, and deposition was carried out such that the deposited part was made into an alloy metallized film with a film resistance of 18Ω/□ (aluminum: zinc=5:95 (mass ratio)). Each deposited part and each margin were then slit at the center with a blade and formed into a tape-like take-up reel with a full width of 21 mm having a margin of 1.0 mm on the left or right side. One left-margin reel and one right-margin reel obtained were laminated each other such that the deposited portion protruded from the margin in the width direction by 0.5 mm and wound to obtain a wound roll with an electrical capacitance of about 0.47 μF. For winding the element, KAW-4NHB manufactured by KAIDO MFG. CO., LTD. was used.

In the production of the capacitor described above, visual observation was carried out from the start of the winding to the end of the winding, and those which caused weaving or wrinkling were evaluated as unsatisfactory. The number ratio of those which were evaluated as unsatisfactory to the total production was expressed as a percentage and used as an index of processability (hereinafter referred to as element winding yield). The element winding yield is preferably as high as possible. Not less than 95% is good "A", not less than 80% and less than 95% is "B", and less than 80% is poor "C". A or B is at a practical level.

(9) Evaluation of Metallized Capacitor Characteristics

Ten capacitor elements were picked out from the capacitor elements (wound rolls) obtained in Section (8) and pressed at a temperature of 120° C. and a pressure of 30 kg/cm² for 6 minutes, and metallikon and attachment of lead terminals were carried out. These elements were armored with urethane resin to produce capacitors with an electrical capacitance of 0.47 μF.

Using the ten capacitors thus obtained, an AC voltage of 900 V was applied to the capacitors under normal temperature. The so-called "step-up" test was performed, in which gradually increasing the applied voltage stepwise at 50 V/3 min after the lapse of 3 minutes at 900 V was repeated. The point at which the current of an application instrument suddenly changed was defined as breakdown. When breakdown occurred after t seconds upon application of n V, breakdown voltage was calculated by the equation [n+50×t/180].

For example, when breakdown occurred after 53 seconds upon application of 950 V:

950+50×53/180=965 V

The calculated voltage was divided by the film thickness for evaluation of the withstand voltage.

Capacitors after the breakdown were disassembled to examine the state of the breakdown, and the preservability was evaluated as follows:

AA: Capacitor shows no change in shape, and no penetrating breakdown is observed.

A: Capacitor shows no change in shape, and a penetrating breakdown within 10 or less layers of a film is observed.

B: Capacitor shows changes in shape, or a penetrating breakdown over 10 layers is observed.

C: Capacitor shape is broken down.

Capacitors of AA can be used without any problem, but capacitors of A can be used depending on the conditions. Capacitors of B or C have a practical problem.

(10) Evaluation of Noise Characteristics

Ten capacitor elements were picked out from the capacitor elements (wound rolls) obtained in Section (8) and pressed at a temperature of 120° C. and a pressure of 30 kg/cm² for 6 minutes, and metallikon and attachment of lead terminals were carried out to produce ten flat pressed-type capacitors with an electrical capacitance of 1.0 μF. A square wave of 60 Hz was applied to the capacitors with a pressure pulse tester, MODEL: TP-500 (manufactured by BUNAN instruments Co., Ltd.). At this time, the noise produced by the capacitors was measured using Sound Level Meter: NA-29E produced by RION Co., Ltd., and the average value was calculated as a noise level. The results were judged by the following criteria. The principal conditions at this time are as follows:

Background noise level: 30 to 35 dB
Test voltage: 205 V
Distance between element and sound collecting microphone: 5 cm
Number of measurements: 10
AA: Noise level of less than 45 dB
A: Noise level of not less than 45 dB and less than 50 dB
B: Noise level of not less than 50 dB and less than 55 dB
C: Noise level of 55 dB or more

EXAMPLES

The effects will be further described below by way of examples.

Example 1

A polypropylene resin comprising polypropylene having a meso pentad fraction of 0.985 and a melt mass flow rate (MFR) of 2.6 g/10 min ("Borclean (registered trademark) available from Borealis") and a branched polypropylene resin having three tri-substituted internal olefins per 10,000 carbon atoms (high melt strength polypropylene, Profax PF-814 available from Basell) were mixed. The content of the branched polypropylene resin was 0.5% by mass based on the total mass of the mixed resin. The mixed resin was supplied to an extruder at a temperature of 260° C. and melt extruded from a T-shaped slit die into a sheet at a resin temperature of 255° C. The melt sheet was solidified by cooling on a cooling drum with a diameter of 1.2 m maintained at 60° C. The retention time at 115 to 135° C. was measured with a radiation thermometer to be 2 seconds.

The sheet solidified by cooling was then preheated at 130° C., passed between rolls provided with a difference in peripheral speed, and stretched 4.6-fold in the longitudinal direction. At this time, the stretching was performed by adding heat at a stretching portion using 3.5 kW of radiation heater output. The film was then guided to a tenter, stretched 10-fold in the width direction at a temperature of 164° C., and then heat treated at 155° C. while being subjected to 6% relaxation in the width direction. Further, after the biaxial stretching, the film was stretched in the longitudinal direction at a stretching ratio of 2.5% and cooled to obtain a biaxially oriented polypropylene film with a film thickness of 7.0 μm. Further, the film surface not in contact with the cooling drum was corona discharge treated in air at a treatment intensity of 20 W·min/m². The characteristics of the biaxially oriented polypropylene film thus obtained are as shown in Tables 2 and 3.

The dielectric breakdown voltage, processability into elements, and noise characteristics of the film obtained are also shown in Tables 2 and 3. The withstand voltage, processability into elements, and noise characteristics were all excellent.

Example 2

The film formation was carried out in the same manner as in Example 1 except that the stretching ratio of the stretching in the longitudinal direction performed after the biaxial stretching was 0.5% to obtain a biaxially oriented polypropylene film. The characteristics of the biaxially oriented polypropylene film obtained are shown in Tables 2 and 3.

Example 3

The film formation was carried out in the same manner as in Example 1 except that the cooling drum temperature was 80° C. to obtain a biaxially oriented polypropylene film. The retention time at 115 to 135° C. during the solidification by cooling was measured with a radiation thermometer to be 2.4 seconds. The characteristics of the biaxially oriented polypropylene film obtained are shown in Tables 2 and 3.

Example 4

The film formation was carried out in the same manner as in Example 1 except that the cooling drum temperature was 50° C. to obtain a biaxially oriented polypropylene film. The retention time at 115 to 135° C. during the solidification by cooling was measured with a radiation thermometer to be 1 second. The characteristics of the biaxially oriented polypropylene film obtained are shown in Tables 2 and 3.

Example 5

The film formation was carried out in the same manner as in Example 4 except that the stretching ratio of the stretching in the longitudinal direction performed after the biaxial stretching was 3.0% to obtain a biaxially oriented polypropylene film. The characteristics of the biaxially oriented polypropylene film obtained are shown in Tables 2 and 3.

Example 6

The film formation was carried out in the same manner as in Example 3 except that the stretching ratio of the stretching in the longitudinal direction performed after the biaxial stretching was 0.0% to obtain a biaxially oriented polypropylene film. The characteristics of the biaxially oriented polypropylene film obtained are shown in Tables 2 and 3.

Example 7

The film formation was carried out in the same manner as in Example 1 except that the content of the branched polypropylene resin was 12% by mass to obtain a biaxially oriented polypropylene film. The characteristics of the biaxially oriented polypropylene film obtained are shown in Tables 2 and 3.

Example 8

The film formation was carried out in the same manner as in Example 1 except that the content of the branched polypropylene resin was 0.02% by mass to obtain a biaxially oriented polypropylene film. The characteristics of the biaxially oriented polypropylene film obtained are shown in Tables 2 and 3.

Example 9

The film formation was carried out in the same manner as in Example 1 except that the content of the branched polypropylene resin was 10% by mass to obtain a biaxially oriented polypropylene film. The characteristics of the biaxially oriented polypropylene film obtained are shown in Tables 2 and 3.

Example 10

The film formation was carried out in the same manner as in Example 1 except that the content of the branched polypropylene resin was 0.01% by mass to obtain a biaxially oriented polypropylene film. The characteristics of the biaxially oriented polypropylene film obtained are shown in Tables 2 and 3.

Example 11

The film formation was carried out in the same manner as in Example 1 except that the radiation heater output was 2.0 kW to obtain a biaxially oriented polypropylene film. The characteristics of the biaxially oriented polypropylene film obtained are shown in Tables 2 and 3.

Example 12

The film formation was carried out in the same manner as in Example 1 except that the preheating temperature before stretching was 140° C. to obtain a biaxially oriented polypropylene film. The characteristics of the biaxially oriented polypropylene film obtained are shown in Tables 2 and 3.

Comparative Example 1

The film formation was carried out in the same manner as in Example 1 except that a branched polypropylene resin was not added to obtain a biaxially oriented polypropylene film. The characteristics of the biaxially oriented polypropylene film obtained are shown in Tables 2 and 3.

Comparative Example 2

The film formation was carried out in the same manner as in Example 1 except that the cooling drum temperature was 90° C. to obtain a biaxially oriented polypropylene film. The retention time at 115 to 135° C. during the solidification by cooling was measured with a radiation thermometer to be 3.1 seconds. The characteristics of the biaxially oriented polypropylene film obtained are shown in Tables 2 and 3. Traces of corona discharge were observed in the capacitor element after the test.

Comparative Example 3

The film formation was carried out in the same manner as in Example 1 except that the radiation heater output was 10.5 kW to obtain a biaxially oriented polypropylene film. The characteristics of the biaxially oriented polypropylene film obtained are shown in Tables 2 and 3. Traces of corona discharge were observed in the capacitor element after the test.

Comparative Example 4

The film formation was carried out in the same manner as in Example 1 except that the preheating temperature before stretching was 150° C. to obtain a biaxially oriented polypropylene film. The characteristics of the biaxially oriented polypropylene film obtained are shown in Tables 2 and 3.

Comparative Example 5

The film formation was carried out in the same manner as in Example 1 except that the cooling drum temperature was 30° C. to obtain a biaxially oriented polypropylene film. The retention time at 115 to 135° C. during the solidification by cooling was measured with a radiation thermometer to be 0.8 seconds. The characteristics of the biaxially oriented polypropylene film obtained are shown in Tables 2 and 3.

Comparative Example 6

The film formation was carried out in the same manner as in Example 1 except that the radiation heater output was 1.5 kW to obtain a biaxially oriented polypropylene film. The characteristics of the biaxially oriented polypropylene film obtained are shown in Tables 2 and 3.

Comparative Example 7

The film formation was carried out in the same manner as in Example 1 except that the cooling drum temperature was 90° C. and the preheating temperature before stretching was 115° C. to obtain a biaxially oriented polypropylene film. The retention time at 115 to 135° C. during the solidification by cooling was measured with a radiation thermometer to be 3.1 seconds. The characteristics of the biaxially oriented polypropylene film obtained are shown in Tables 2 and 3. Meandering of the film was frequently observed during the film formation and element winding.

Comparative Example 8

The film formation was carried out in the same manner as in Example 1 except that the radiation heater output was 5.5 kW to obtain a biaxially oriented polypropylene film. The characteristics of the biaxially oriented polypropylene film obtained are shown in Tables 2 and 3.

TABLE 1

|  | A Surface |
|---|---|
| SRa' [nm] | 20.1 |
| SRz' [nm] | 715 |
| SRmax' [nm] | 813 |
| M-AREA [mm$^2$] | 0.249 |
| S-AREA [mm$^2$] | 0.1 |

| Z [nm] | COUNT |
|---|---|
| 50 | 0.00000 |
| 100 | 0.00000 |
| 150 | 42.57020 |
| 200 | 22.89150 |
| 250 | 11.64650 |
| 300 | 6.82730 |
| 350 | 5.62248 |
| 400 | 4.81927 |
| 450 | 2.81124 |
| 500 | 2.40963 |
| 550 | 2.40963 |
| 600 | 2.00803 |
| 650 | 2.00803 |
| 700 | 2.00803 |
| 750 | 0.80321 |
| 800 | 0.40160 |
| 850 | 0.00000 |
| 900 | 0.00000 |
| 950 | 0.00000 |
| 1000 | 0.00000 |
| 1050 | 0.00000 |
| 1100 | 0.00000 |
| 1150 | 0.00000 |
| 1200 | 0.00000 |
| 1250 | 0.00000 |
| 1300 | 0.00000 |

TABLE 2

| | Thickness t1 (μm) | Surface in Contact with Cooling Drum | | | | Surface not in Contact with Cooling Drum | | | | Thermal Shrinkage Stress (N/mm2) | Branched Polypropylene Content (mass %) |
|---|---|---|---|---|---|---|---|---|---|---|---|
| | | SRa (nm) | SRz (nm) | Pc (number/0.1 mm2) | PhZ (nm) | SRa (nm) | SRz (nm) | Pc (number/0.1 mm2) | PhZ (nm) | | |
| Example 1 | 7.0 | 29.8 | 610 | 354 | 340 | 30.2 | 614 | 365 | 340 | 2.0 | 0.5 |
| Example 2 | 7.0 | 30.2 | 615 | 359 | 350 | 31.2 | 622 | 367 | 340 | 0.8 | 0.5 |
| Example 3 | 7.0 | 39.2 | 783 | 486 | 380 | 38.9 | 792 | 475 | 390 | 1.8 | 0.5 |
| Example 4 | 7.0 | 21.7 | 433 | 176 | 150 | 23.2 | 459 | 173 | 160 | 2.4 | 0.5 |
| Example 5 | 7.0 | 21.5 | 438 | 182 | 150 | 22.8 | 452 | 170 | 160 | 3.2 | 0.5 |
| Example 6 | 7.0 | 38.2 | 778 | 488 | 380 | 38.8 | 790 | 478 | 390 | 0.4 | 0.5 |
| Example 7 | 7.0 | 39.6 | 780 | 493 | 380 | 39.0 | 786 | 498 | 380 | 0.8 | 12 |
| Example 8 | 7.0 | 21.2 | 428 | 163 | 350 | 21.5 | 438 | 162 | 370 | 2.9 | 0.02 |
| Example 9 | 7.0 | 37.8 | 768 | 402 | 340 | 38.0 | 798 | 413 | 290 | 0.9 | 10 |
| Example 10 | 7.0 | 20.3 | 398 | 153 | 340 | 20.2 | 389 | 156 | 330 | 3.0 | 0.01 |
| Example 11 | 7.0 | 29.3 | 616 | 182 | 150 | 19.8 | 402 | 155 | 120 | 2.3 | 0.5 |
| Example 12 | 7.0 | 40.3 | 790 | 498 | 390 | 39.8 | 798 | 498 | 390 | 0.9 | 0.5 |
| Comparative Example 1 | 7.0 | 28.5 | 729 | 330 | 340 | 21.3 | 452 | 98 | 340 | 1.9 | 0 |
| Comparative Example 2 | 7.0 | 40.3 | 1034 | 598 | 750 | 39.5 | 1028 | 630 | 820 | 1.6 | 0.5 |
| Comparative Example 3 | 7.0 | 37.0 | 639 | 429 | 390 | 40.2 | 1105 | 642 | 860 | 1.6 | 0.5 |
| Comparative Example 4 | 7.0 | 40.3 | 827 | 512 | 540 | 39.8 | 798 | 498 | 550 | 0.4 | 0.5 |
| Comparative Example 5 | 7.0 | 19.8 | 105 | 132 | 90 | 17.6 | 93 | 121 | 80 | 2.0 | 0.5 |
| Comparative Example 6 | 7.0 | 29.2 | 618 | 328 | 220 | 17.8 | 387 | 168 | 90 | 2.3 | 0.5 |
| Comparative Example 7 | 7.0 | 29.8 | 758 | 625 | 360 | 23.8 | 652 | 618 | 350 | 2.4 | 0.5 |
| Comparative Example 8 | 7.0 | 31.3 | 642 | 363 | 350 | 41.2 | 950 | 485 | 550 | 1.7 | 0.5 |

TABLE 3

| | Original Film Withstand Voltage (V/μm) | Original Film Winding Characteristics | Element Winding Yield | Capacitor Characteristics AC Withstand Voltage (V/μm) | Preservability | Noise Characteristics Noise Level (dB) | Judgment |
|---|---|---|---|---|---|---|---|
| Example 1 | 613 | A | A | 142 | AA | 46 | A |
| Example 2 | 613 | A | A | 142 | AA | 50 | B |
| Example 3 | 592 | A | A | 145 | AA | 48 | A |
| Example 4 | 630 | A | A | 136 | A | 35 | AA |
| Example 5 | 629 | A | A | 134 | A | 28 | AA |
| Example 6 | 591 | A | A | 145 | AA | 54 | B |
| Example 7 | 645 | A | A | 145 | AA | 47 | A |
| Example 8 | 630 | B | B | 133 | A | 34 | AA |
| Example 9 | 643 | A | A | 140 | A | 53 | B |
| Example 10 | 648 | B | B | 133 | A | 44 | AA |
| Example 11 | 638 | B | B | 144 | A | 44 | AA |
| Example 12 | 582 | B | B | 143 | A | 52 | B |
| Comparative Example 1 | 586 | B | B | 132 | B | 52 | B |
| Comparative Example 2 | 579 | A | A | 136 | C | 56 | C |
| Comparative Example 3 | 615 | A | A | 140 | C | 58 | C |
| Comparative Example 4 | 601 | A | A | 143 | B | 62 | C |
| Comparative Example 5 | 621 | C | C | 140 | C | 53 | B |
| Comparative Example 6 | 638 | B | B | 132 | C | 43 | AA |
| Comparative Example 7 | 564 | C | C | 143 | AA | 57 | C |
| Comparative Example 8 | 558 | A | A | 126 | B | 62 | C |

The invention claimed is:

1. A biaxially oriented polypropylene film having projections on both surfaces of the film, wherein a height of a most common projection (PhZ) among the projections on each surface is not less than 100 nm and less than 400 nm on both surfaces, the number of projections per 0.1 mm$^2$ (Pc) on each surface is not less than 150 and less than 500 on both surfaces, and the film has a thermal shrink stress value in a longitudinal direction at 120° C. of 0.8 to 3.0 N/mm$^2$.

2. The biaxially oriented polypropylene film according to claim 1, wherein both surfaces have a 10-point average roughness (SRz) of not less than 400 nm and not more than 850 nm.

3. The biaxially oriented polypropylene film according to claim 2, wherein both surfaces have a center line surface roughness (SRa) of not less than 20 nm and not more than 40 nm.

4. The biaxially oriented polypropylene film according to claim 2, containing a branched polypropylene (H) in an amount of 0.02 to 10% by mass.

5. A metallized film formed by providing at least one surface of the biaxially oriented polypropylene film according to claim 2 with a metal film.

6. The biaxially oriented polypropylene film according to claim 1, wherein both surfaces have a center line surface roughness (SRa) of not less than 20 nm and not more than 40 nm.

7. The biaxially oriented polypropylene film according to claim 6, containing a branched polypropylene (H) in an amount of 0.02 to 10% by mass.

8. A metallized film formed by providing at least one surface of the biaxially oriented polypropylene film according to claim 6 with a metal film.

9. The biaxially oriented polypropylene film according to claim 1, containing a branched polypropylene (H) in an amount of 0.02 to 10% by mass.

10. A metallized film formed by providing at least one surface of the biaxially oriented polypropylene film according to claim 9 with a metal film.

11. A capacitor comprising a metallized film formed by providing at least one surface of the biaxially oriented polypropylene film according to claim 1 with a metal film having a surface electrical resistance of 1 to 20Ω/□.

* * * * *